US010295079B2

(12) United States Patent
Dordoni et al.

(10) Patent No.: US 10,295,079 B2
(45) Date of Patent: May 21, 2019

(54) OVERRIDE FOR A VALVE ASSEMBLY

(71) Applicant: Cameron International Corporation, Houston, TX (US)

(72) Inventors: Mattia Dordoni, Monticelli Pavese (IT); Davide Negrini, Voghera (IT)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/718,783

(22) Filed: Sep. 28, 2017

(65) Prior Publication Data

US 2018/0094747 A1 Apr. 5, 2018

(30) Foreign Application Priority Data

Sep. 30, 2016 (EP) ..................... 16275147

(51) Int. Cl.
*F16K 31/53* (2006.01)
*F16K 31/04* (2006.01)
*F16K 31/05* (2006.01)
*F16K 37/00* (2006.01)
*F16H 1/46* (2006.01)
*F16K 5/06* (2006.01)
*F16K 31/528* (2006.01)
*E21B 33/06* (2006.01)
(Continued)

(52) U.S. Cl.
CPC ............... *F16K 31/53* (2013.01); *F16H 1/46* (2013.01); *F16K 5/06* (2013.01); *F16K 31/043* (2013.01); *F16K 31/055* (2013.01); *F16K 31/5286* (2013.01); *F16K 31/535* (2013.01); *F16K 37/005* (2013.01); *F16K 37/0041* (2013.01); *E21B 33/06* (2013.01); *E21B 34/02* (2013.01); *E21B 2034/002* (2013.01)

(58) Field of Classification Search
CPC ........ F16K 31/53; F16K 5/06; F16K 37/0041; F16K 31/5286; F16K 31/535; F16K 31/043; F16K 31/055; F16K 37/005; F16H 1/46; E21B 2034/002; E21B 33/06; E21B 34/02
See application file for complete search history.

(56) References Cited

U.S. PATENT DOCUMENTS

| 4,113,063 A | * | 9/1978 | Troy ......................... F03G 1/08 |
| | | | 185/40 R |
| 4,170,169 A | | 10/1979 | Shafer |
| 4,261,546 A | | 4/1981 | Cory et al. |
| (Continued) | | | |

OTHER PUBLICATIONS

PCT International Search Report & Written Opinion for PCT Application No. PCT/US2017/054575 dated Nov. 10, 2017; 13 pgs.

*Primary Examiner* — Marina A Tietjen
(74) *Attorney, Agent, or Firm* — Fletcher Yoder, P.C.

(57) ABSTRACT

Embodiments of the present disclosure relate to a valve assembly that includes a valve configured to adjust a flow of fluid through a valve body of the valve assembly, an actuator configured to drive rotation of the valve, a gear assembly having a first planetary gear assembly and a second planetary gear assembly, where the first planetary gear assembly is coupled to the actuator, and where the second planetary gear assembly is coupled to the valve, and an override assembly coupled to the second planetary gear assembly, where the override assembly is configured to drive rotation of the valve independent of the actuator and without disengaging the actuator from the gear assembly.

18 Claims, 7 Drawing Sheets

(51) Int. Cl.
    *E21B 34/02*     (2006.01)
    *E21B 34/00*     (2006.01)

(56) References Cited

U.S. PATENT DOCUMENTS

| | | |
|---|---|---|
| 4,407,326 A | 10/1983 | Wilhelm |
| 4,616,528 A | 10/1986 | Malinski et al. |
| 4,760,989 A | 8/1988 | Elliott et al. |
| 2005/0184265 A1* | 8/2005 | Aoki ............... F16K 31/055 251/248 |
| 2011/0049407 A1 | 3/2011 | Park |
| 2012/0175536 A1* | 7/2012 | Hanson ........... F16K 37/0083 251/129.01 |
| 2012/0264562 A1 | 10/2012 | Park |

* cited by examiner

OVERRIDE FOR A VALVE ASSEMBLY

CROSS REFERENCE TO RELATED APPLICATIONS

This application claims priority from and the benefit of European Patent Application No. EP16275147, filed Sep. 30, 2016, entitled "OVERRIDE FOR A VALVE ASSEMBLY," the disclosure of which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Mineral extraction systems, fluid transportation systems, product storage systems, and/or fluid compression systems may include one or more valves that may adjust, block, and/or facilitate flow of a fluid from a surface to a wellbore or vice versa. In some cases, a position of the one or more valves may be adjusted (e.g., driven) by an actuator (e.g., an electric motor, a hydraulic actuator, or a pneumatic actuator). For example, a control system may instruct the actuator to adjust a position of the one or more valves based on conditions in the mineral extraction system. When certain conditions exist in the mineral extraction system (e.g., blowout conditions), the one or more valves may be adjusted to a closed position to completely block a flow of fluid from the wellbore to the surface (e.g., during blowout). Unfortunately, the actuator of the one or more valves may fail, and thus, adjusting the position of the one or more valves may be cumbersome and/or time-consuming.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
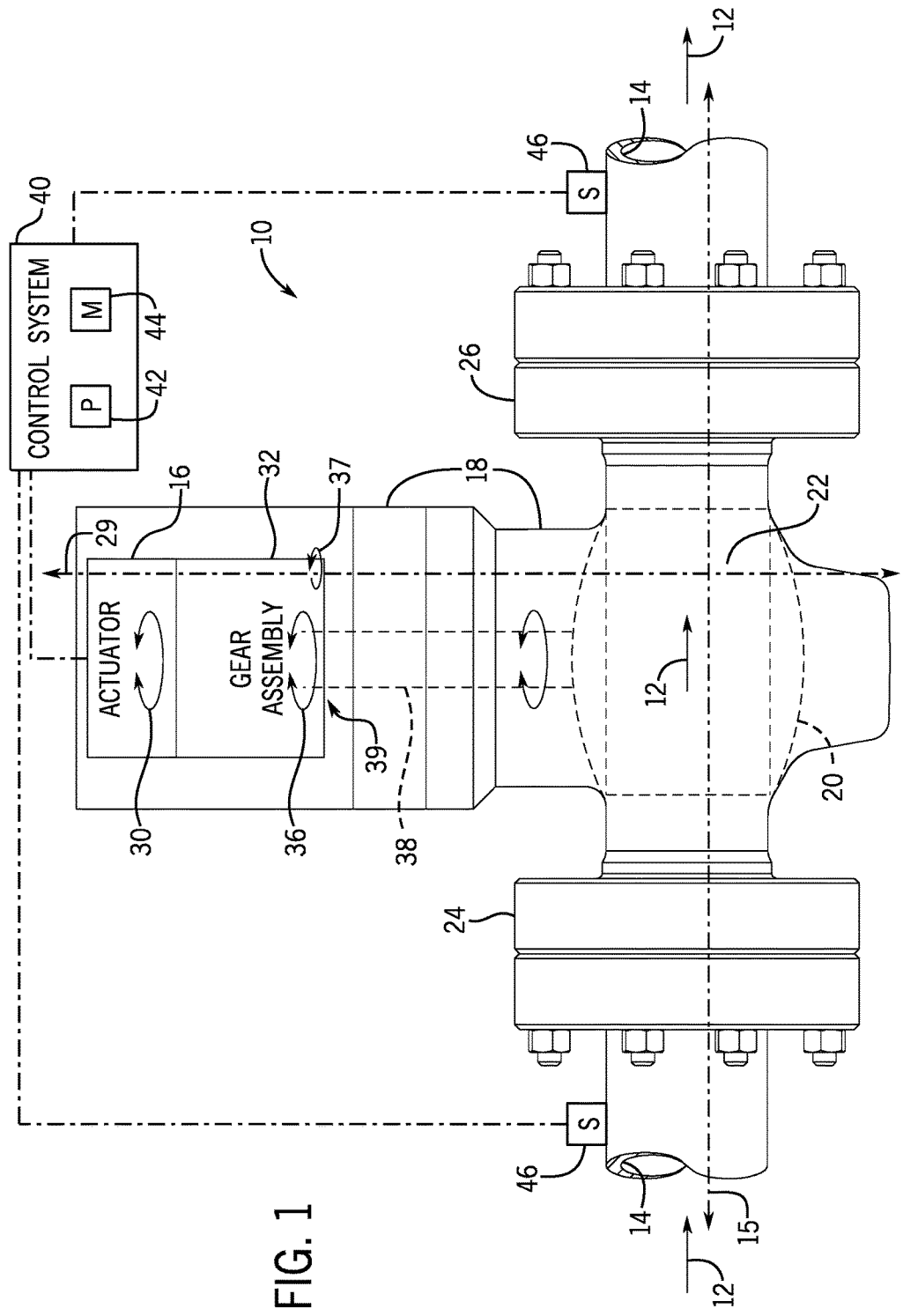
FIG. 1 is a schematic a valve assembly having an actuator that may be used in a mineral extraction system, in accordance with an aspect of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed to an override system for a valve assembly (e.g., a quarter turn valve) utilized in a mineral extraction system. As discussed above, typical valves are operated by an actuator (e.g., an electric motor, a hydraulic actuator, or a pneumatic actuator) that is configured to drive a position of the valve to adjust an amount of flow through the valve. Accordingly, a control system may instruct the actuator to adjust the position of the valve based on fluid parameters (e.g., pressure, flow rate, temperature, density, viscosity, gas composition, solids composition, etc.) of the mineral extraction system. In some cases, the fluid parameters may be indicative of a pressure in tubulars of the mineral extraction system and/or a wellbore of the mineral extraction system. Accordingly, the valve may block a flow of fluid through the tubular when the pressure meets or exceeds a threshold (e.g., during blow out conditions).

However, in some cases, the actuator may fail to respond to a command to adjust the position of the valve. For example, a connection (e.g., a wireless or wired connection) between the actuator and a control system may be interrupted such that the actuator may not adjust the position of the valve. Additionally, the actuator may jam and/or otherwise fail to operate, such that adjusting the position of the valve may be problematic. Specifically, when a drivetrain of the actuator is jammed and/or inoperable, a position of the valve may not be adjusted, which may prevent an operator and/or controller from blocking fluid flow in the tubular and/or otherwise controlling fluid flow through the tubular.

Embodiments of the present disclosure relate to an improved override system for a valve assembly that is independent from (e.g., not coupled to and/or otherwise operated with) an actuator of the valve assembly. Accordingly, present embodiments may adjust a position of the valve when the actuator fails to operate without disengaging the actuator from a portion of the valve assembly. In some embodiments, the valve assembly may include differential gears that drive movement of a valve member (e.g., a ball, a plug, a choke, or the like) to adjust a diameter of an opening that enables fluid flow through a valve body. In some cases, a first gear assembly (e.g., a first planetary gear assembly) may be coupled to the actuator. During normal operation (e.g., when the actuator ultimately controls movement of the valve member), the actuator may drive rotation of the first gear assembly, which may in turn drive rotation of a second gear assembly (e.g., a second planetary gear assembly) coupled to a shaft of the valve assembly. The shaft of the valve assembly may be coupled to the valve member (e.g., via a valve trunnion), and thus, rotation of the shaft may adjust a position of the valve member. In some embodiments, selection of gear ratios of the gear assembly may enable the valve assembly to include a transmission ratio of 1 (or approximately 1) from the shaft to the valve member when operating under normal conditions.

In the event that the actuator fails to operate, in order to override the actuator, an external gear (e.g., an override gear) may also be coupled to the second gear assembly. For example, to override normal operation (e.g., adjustment of valve position without using the actuator), the external gear may be actuated to drive rotation of the second gear assembly (but not the first gear assembly), which may in turn move the valve member (e.g., independent of the actuator).

To help illustrate the manner in which the present embodiments may be used in a system, FIG. 1 is a diagrammatic illustration of an enhanced valve assembly 10 for controlling a flow 12 of a fluid through a flow path 14 along a first axial axis 15 (or a first axial direction). The valve assembly 10 comprises an actuator 16 that is coupled to a valve body 18. The valve body 18 may support any number of valve types, examples of which are butterfly valves, ball valves, quarter-turn valves, plug valves, gate valves, and choke valves, among others. As shown in the illustrated embodiment, the valve body 18 carries a ball valve 20. In an open configuration, a through bore 22 of the ball valve 20 is aligned with an inlet 24 and an outlet 26 of the valve assembly 10. This allows the flow 12 to pass through the valve 20. The flow 12 can be interrupted by turning the ball valve 20 to place the through bore 22 perpendicular to the inlet 24 and outlet 26. In other words, a quarter-turn of the ball valve 20 transitions the valve assembly 10 between open and closed configurations. While the present discussion relates to the valve assembly 10 having the ball valve 20, it should be recognized that the embodiments of the present disclosure may be utilized with any suitable valve, such as a gate valve, a choke valve, or the like. For example, in some embodiments, the valve assembly 10 may be configured move the valve 20 laterally (e.g., up and down or side to side) rather than rotate the valve 20 circumferentially.

To effectuate the quarter-turn of the valve 20, the actuator 16 provides a motive force through a drive source, such as a hydraulic actuator, an electric and linear motor, a pneumatic device, or a manual wheel, among others. In the illustrated embodiment, the actuator 16 provides circumferential motion about a second axial axis 29, as represented by arrow 30. Accordingly, the circumferential motion 30 of the actuator 16 may ultimately drive rotation of a gear assembly 32 coupled to the valve 20. Accordingly, the gear assembly may produce a rotational output 36, which rotates the valve 20. However, in other embodiments, the actuator 16 may provide linear motion, which may not directly actuate the ball valve 20 because the position of the ball valve 20 is adjusted via rotation (e.g., a quarter-turn). In the embodiments where the actuator 16 provides linear motion, the gear assembly 32 (e.g., via a scotch yoke device), which is coupled to the actuator 16, may translate the linear motion of the actuator 16 into the rotational output 36. Specifically, the gear assembly 32 transfers linear motive input of the actuator 16 into the rotational output 36 causing the valve to rotate in the circumferential direction 30 (e.g., defined by rotation about the axis 29).

In any case, a valve stem 38 attached to the ball valve 20 may be coupled to an output 39 of the gear assembly 32. The valve stem 38 may be fixed to the ball valve 20, and thus, torque applied to the valve stem 38 is transferred to the ball valve 20, thereby causing rotation of the ball valve 20. Thus, the rotational output 36 of the gear assembly 32 drives rotation of the valve stem 38 and the ball valve 20. Viewing the valve assembly 10 as a whole, the actuator 16 can be used to rotate the ball valve 20 and transition the valve assembly 10 between the open and closed configurations and to control the flow 12 through the flow path 14. In some embodiments, the valve assembly 10 may be used to adjust a flow rate of the flow 12 to a set point (e.g., a desired value). In other embodiments, the valve assembly 10 may be used in an on/off manner to allow or restrict flow from upstream components to downstream components along the flow path 14 (e.g., during blow out conditions).

To adjust the position of the ball valve 20, the valve assembly may include a control system 40. The control system 40 may include a processor 42 and memory circuitry 44 that stores one or more instructions to be executed by the processor 42. The control system 40 may be configured to send signals (e.g., commands) to the actuator 16 to initiate motion (e.g., the circumferential motion 30) that drives rotation of the ball valve 20 the axis 29. Further, in some embodiments, a sensor 46 (e.g., a flow sensor, a pressure sensor, a piezoelectric sensor, an optical sensor, an acoustic sensor, a vibration sensor, and/or another suitable sensor) may be disposed along the flow path 14 in order to monitor one or more characteristics of the fluid flow 12 through the flow path 14. As shown in the illustrated embodiment, the sensor 46 may be disposed downstream of the ball valve 20, upstream of the ball valve 20, or both. In some embodiments, the sensor 46 may be coupled to the control system 40 and configured to provide feedback to the control system 40, such that the control system 40 sends the signals to the actuator 16 based at least partially on the feedback from the sensor 46. Further, the control system 40 may be configured to initiate an override assembly 50 (e.g., see FIG. 2) when the sensor 46 provides feedback indicative of a failure of the actuator 16. For example, the control system 40 may detect failure of the actuator when the signals sent to the actuator 16 from the sensor 46 do not generate a predicted response in the characteristics of the fluid flow 12 in the flow path 1, when the sensor 46 detects jamming of the actuator 16 (e.g., a force applied to or by the actuator 16 above a threshold), when the actuator 16 and/or the ball valve 20 do not move at an expected rate or speed, and/or when the actuator 16 and/or the ball valve 20 do not move an expected distance.

Figure 2:
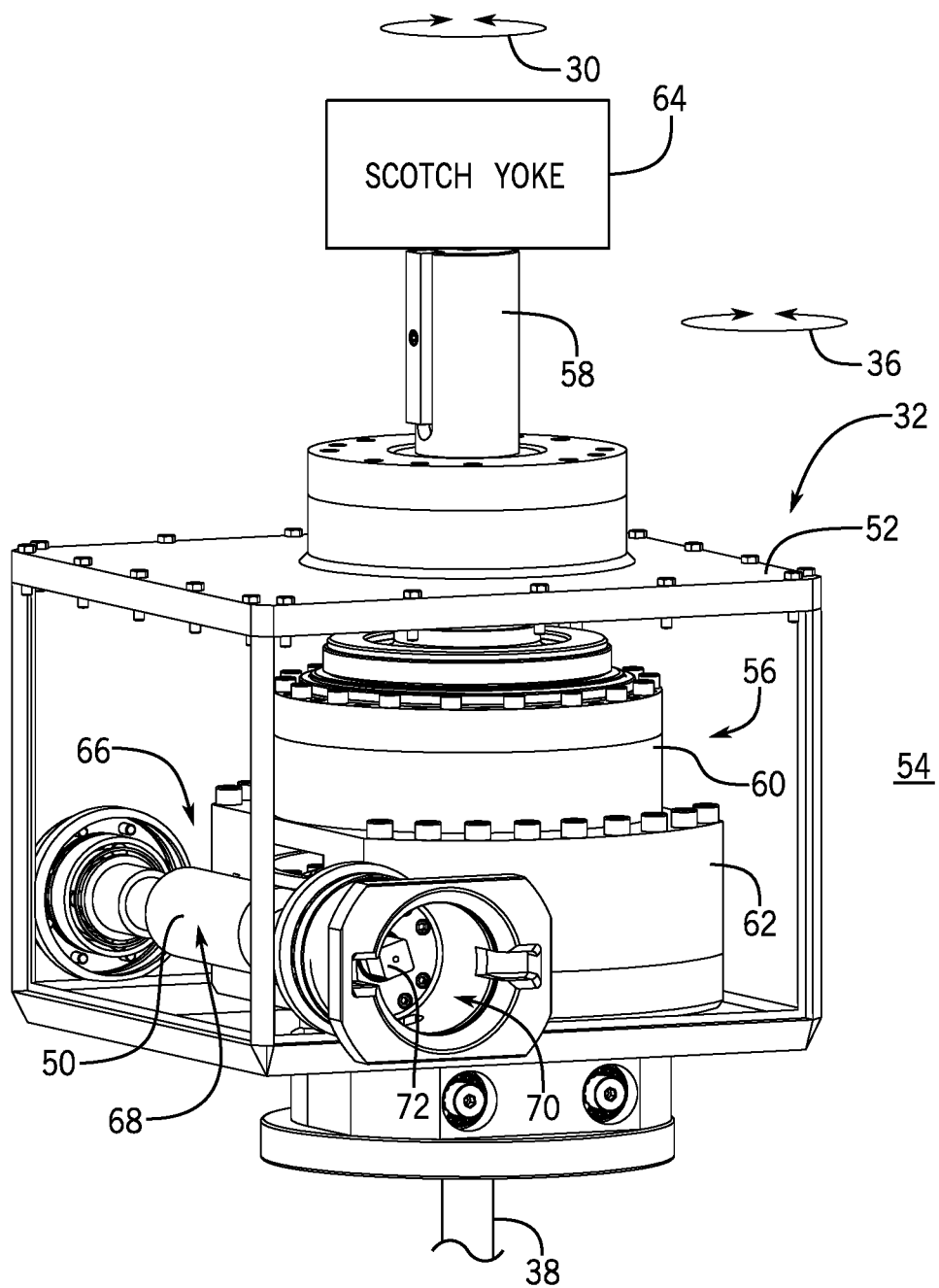
FIG. 2 is a perspective view of an embodiment of the valve assembly of FIG. 1 that includes an override assembly, in accordance with an aspect of the present disclosure.

As discussed above, in some cases, it may be desirable to override the actuator 16 in the case of jamming and/or in the event that the actuator 16 otherwise fails to operate. For example, FIG. 2 is a perspective view of an embodiment of the gear assembly 32 that includes the override assembly 50 (e.g., an actuator override assembly). As shown in the illustrated embodiment of FIG. 2, the gear assembly 32 may be disposed in a housing 52 that may be sealed (e.g., air tight, water tight) from an external environment 54 (e.g., water and/or air) of the valve assembly 10. In some embodiments, the override assembly 50 may extend out of the housing 52, such that the override assembly 50 may be accessible from the external environment 54. In some cases, an operator, a remote operated vehicle (ROV), and/or another suitable device may actuate the override assembly 50. Therefore, the override assembly 50 may adjust a position of the ball valve 20 independent of the actuator 16 and without disengaging the actuator 16 (e.g., from the gear assembly 32).

As shown in the illustrated embodiment of FIG. 2, the gear assembly 32 may include a differential gear configuration 56. Specifically, the gear assembly 32 may include a first shaft 58, a first planetary gear assembly 60, and a second planetary gear assembly 62. Additionally, the gear assembly 32 may include a scotch yoke device 64 that is configured to transfer linear motion of the actuator 16 into the rotational output 36 (e.g., in embodiments where the actuator 16 produces linear motion). The actuator 16 may ultimately rotate the first shaft 58 of the gear assembly 32. In turn, the first shaft 58 may drive rotation of both the first planetary gear assembly 60 and the second planetary gear assembly 62. Additionally, in some embodiments, the secondary planetary gear assembly 62 may be coupled to the valve stem 38 (e.g., via a shaft and/or another suitable coupling device). Accordingly, rotation of the second planetary gear assembly 62 may control a position of the ball valve 20.

Additionally, the override assembly 50 may include an external gear 66 that may be coupled to the second planetary gear assembly 62 and drive rotation of the second planetary gear assembly 62 independent of the first shaft 58, and thus independent of the actuator 16. In some embodiments, the external gear 66 may be a worm screw 68. In other embodiments, the external gear 66 may be another suitable gear. In any case, the override assembly 50 may include an access opening 70 that enables an operator and/or an ROV to actuate (e.g., rotate) the external gear 66. Rotation of the external gear 66 may in turn drive rotation of the second planetary gear assembly 62. Since the second planetary gear assembly 62 is coupled to the valve stem 38, rotation of the external gear 66 ultimately adjusts the position of the ball valve 20 independent of the first shaft 58 and/or the actuator 16. In some embodiments, the access opening 70 may include a tool interface 72 (e.g., a hex nut) that may be coupled to the external gear 66 (e.g., the worm screw 68). Accordingly, an operator and/or an ROV may utilize a tool (e.g., a wrench) that receives the tool interface 72 and enables the operator and/or the ROV to rotate the tool interface 72, and thus the external gear 66.

Figure 3:
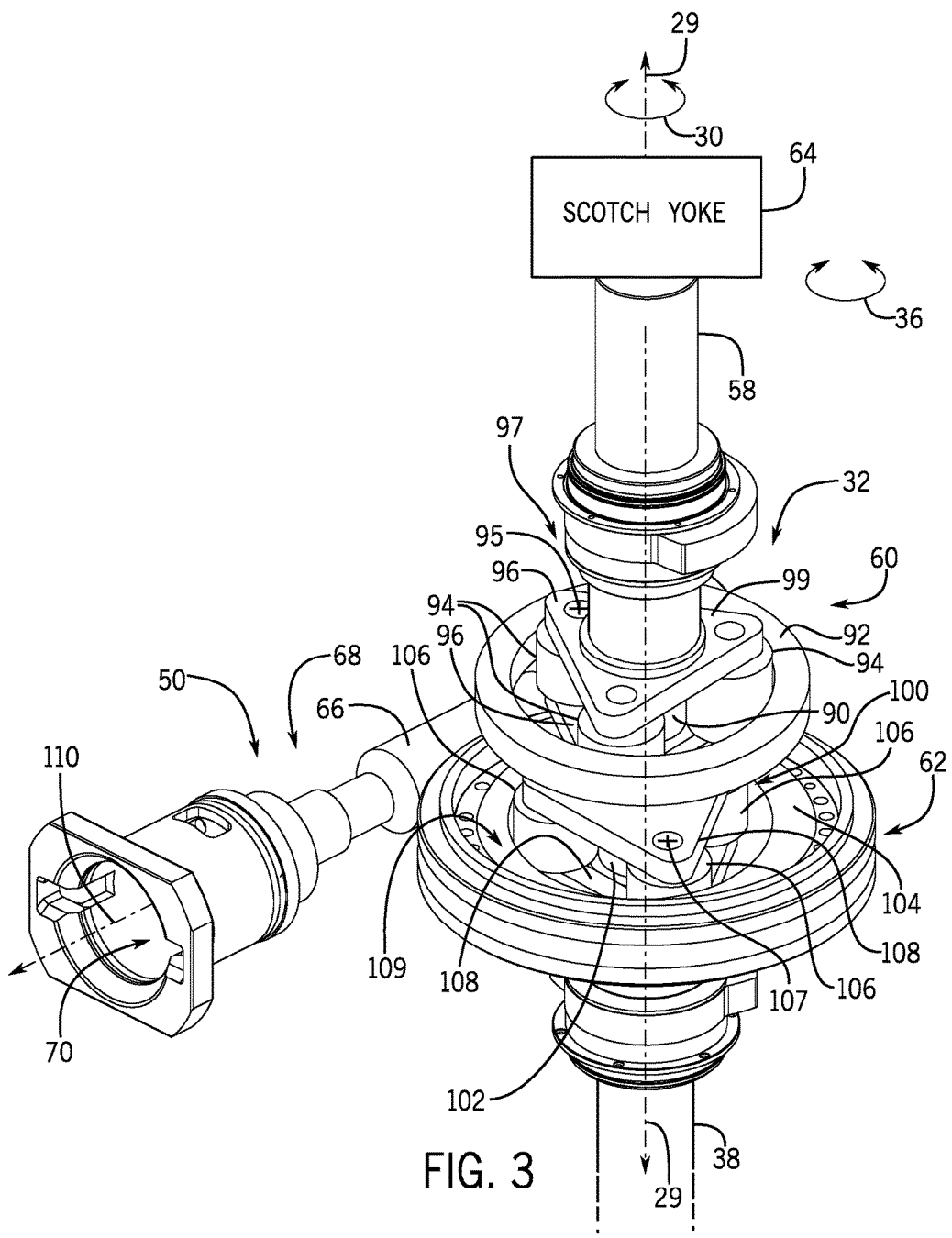
FIG. 3 is a perspective view of an embodiment of a gear assembly and the override assembly of the valve assembly of FIG. 2, in accordance with an aspect of the present disclosure.

FIG. 3 is a perspective view of an embodiment of the gear assembly 32 illustrating the first shaft 58, the first planetary gear assembly 60, and the second planetary gear assembly 62. For example, the first planetary gear assembly 60 may include a first sun gear 90, a first ring gear 92, one or more first planet gears 94, and one or more first carriers 96 that couple the one or more first planet gears 94 to one another. In some embodiments, the first shaft 58 may be coupled to the actuator 16 and to a first carrier 99 of the one or more first carriers 96. Therefore, the rotational output 36 caused by the actuator 16 may drive rotation of the first shaft 58, and thus, the first carrier 99.

The one or more first carriers 96 may support the one or more first planet gears 94. Accordingly, rotation of the first carrier 99 drives rotation of the one or more first planet gears 94. In some embodiments, the rotation of the one or more first planet gears 94 and the one or more first carriers 96 supporting the first planet gears 94 may then drive rotation of the first sun gear 90 m. In particular, the gear teeth of the first sun gear 90 mesh with corresponding gear teeth of each first planet gear 94 within the first carrier 96, such that rotation of each of the first planet gears 94 (e.g., or a planet-carrier assembly 97 that includes the one or more first carriers 96 and the one or more first planet gears 94) about their respective axes 95 drives rotation of the first sun gear 90 about the axis 29. During rotation of the first sun gear 90, the first planet gears 94, and the first carrier 96, the first ring gear 92 remains in a stationary position (e.g., fixed relative to housing 52). As a result, the gear teeth of the first planet gears 94 mesh with corresponding gear teeth of the first ring gear 92, such that rotation of the first planet gears 94 results in movement of the first planet gears 94 circumferentially along the inner circumference of the first ring gear 92.

In certain embodiments, an intermediate shaft 100 may be coupled to the first sun gear 90 of the first planetary gear assembly 60 and to a second sun gear 102 of the second planetary gear assembly 62. The second planetary gear assembly 62 may include the second sun gear 102, a second ring gear 104, one or more second planet gears 106, and one or more second carriers 108. The rotation of the intermediate shaft 100 (e.g., driven by the first sun gear 90) may drive rotation of the second sun gear 102 about the axis 29. The rotation of the second sun gear 102 may then drive rotation of the one or more second planet gears 106 and the one or more second carriers 108 supporting the second planet gears 106. In particular, the gear teeth of the second sun gear 102 mesh with corresponding gear teeth of each second planet gear 106 within the second carrier 108, such that rotation of the second sun gear 102 drives rotation of each planet gear 106 about its respective axis 107 within the second carrier 108, thereby also causing rotation of the second carrier 108 (e.g., planet-carrier assembly 109 of the second carrier 108 and second planet gears 106) about the axis 29. During this rotation of the second sun gear 102, the second planet gears 106, and the second carrier 108, the second ring gear 104 remains in a stationary position (e.g., fixed relative to the housing 52 by the worm screw 68). As a result, the gear teeth of the second planet gears 106 mesh with corresponding gear teeth of the second ring gear 104, such that rotation of the second planet gears 106 results in movement of the second planet gears 106 circumferentially along the inner circumference of the second ring gear 104. In turn, the rotation of the second carrier 108 causes rotation of the ball valve 20, and thus actuates the ball valve 20 between open and closed positions. For example, the second carrier 108 may be coupled to the ball valve 20 via a suitable mechanical linkage or output 39 (e.g., a drive shaft, sleeve, or transmission) and the valve stem 38.

When the actuator 16 fails and/or otherwise stops adjusting the position of the ball valve 20, the override assembly 50 may be actuated to adjust the position of the ball valve 20 independent of the actuator 16 and without disengaging the actuator 16 from the gear assembly 32. As discussed above, an operator, an ROV, and/or another device may actuate the external gear 66 (e.g., via the tool interface 72), thereby causing the external gear 66 to rotate about a circumferential axis 110. In some embodiments, the external gear 66 (e.g., the worm screw 68) may be coupled to the second ring gear 104 of the second planetary gear assembly 62. Accordingly, rotation of the external gear 66 may cause the second ring gear 104 to rotate about the axis 29. The rotation of the second ring gear 104 may then drive rotation of the one or more second planet gears 106 about their axes 107, and the one or more second carriers 108 supporting the second planet gears 106 about the axis 29. In particular, the gear teeth of the second ring gear 104 mesh with corresponding gear teeth of the second planet gears 106, such that rotation of the second ring gear 104 results in movement of the second planet gears 106 circumferentially along the inner circumference of the second ring gear 104, thereby causing rotation of the second carrier 108 (e.g., planet-carrier assembly 109 having the second carrier 108 supporting the second planet gears 106) about the axis 29. In turn, the rotation of the second carrier 108 (e.g., planet-carrier assembly 109) causes rotation of the ball valve 20, and thus actuates the ball valve 20 between open and closed positions.

In certain embodiments, during operation of the override assembly 50, the second sun gear 102 may remain substantially stationary. Therefore, the intermediate shaft 100, and thus the first planetary gear assembly 60, may also remain substantially stationary when the override assembly 50 drives rotation of the ball valve 20. Due to the stationary position of the second sun gear 102 during override operation, the gear teeth of second planet gears 106 may mesh with corresponding gear teeth of the second sun gear 102, such that the second planet gears 106 rotate and move circumferentially about the outer circumference of the second sun gear 102, while the second carrier 108 (e.g., planet-carrier assembly 109) also rotates about the axis 29. Again, the rotation of the second carrier 108 (e.g., planet-carrier assembly 109) causes rotation of the ball valve 20, and thus actuates the ball valve 20 between open and closed positions.

Regardless of whether the position of the ball valve 20 is ultimately adjusted by the actuator 16 or the override assembly 50, the one or more second planet gears 106 and the second carrier 108 rotate about the axis 29. Thus, the one or more second planet gears 106 may be coupled (e.g., directly or indirectly) to the valve stem 38 to rotate the ball valve 20. In some embodiments, the one or more second carriers 108 (e.g., the one or more second carriers couple the one or more second planet gears 106 to one another) may be directly coupled to the valve stem 38. The one or more second carriers 108 may also rotate about the axis 29 as the one or more second planet gears 106 rotate about the axis 29, and thus, the one or more second carriers 108 may adjust the position of the ball valve 20 by driving rotation of the valve stem 38. In other embodiments, the one or more second carriers 108 may be indirectly coupled to the valve stem 38 (e.g., through an intermediate shaft and/or another coupling device such as the output 39).

The override assembly 50 may thus adjust the position of the ball valve 20 independent of the actuator 16. Additionally, the actuator 16 may not be disengaged from the gear assembly 32 and/or another component of the valve assembly 10 to operate the override assembly 50. In the event that the actuator 16 jams and/or otherwise fails to operate, the override assembly 50 may be actuated to adjust the position of the ball valve 20 without performing any action with respect to the actuator 16.

Figure 4:
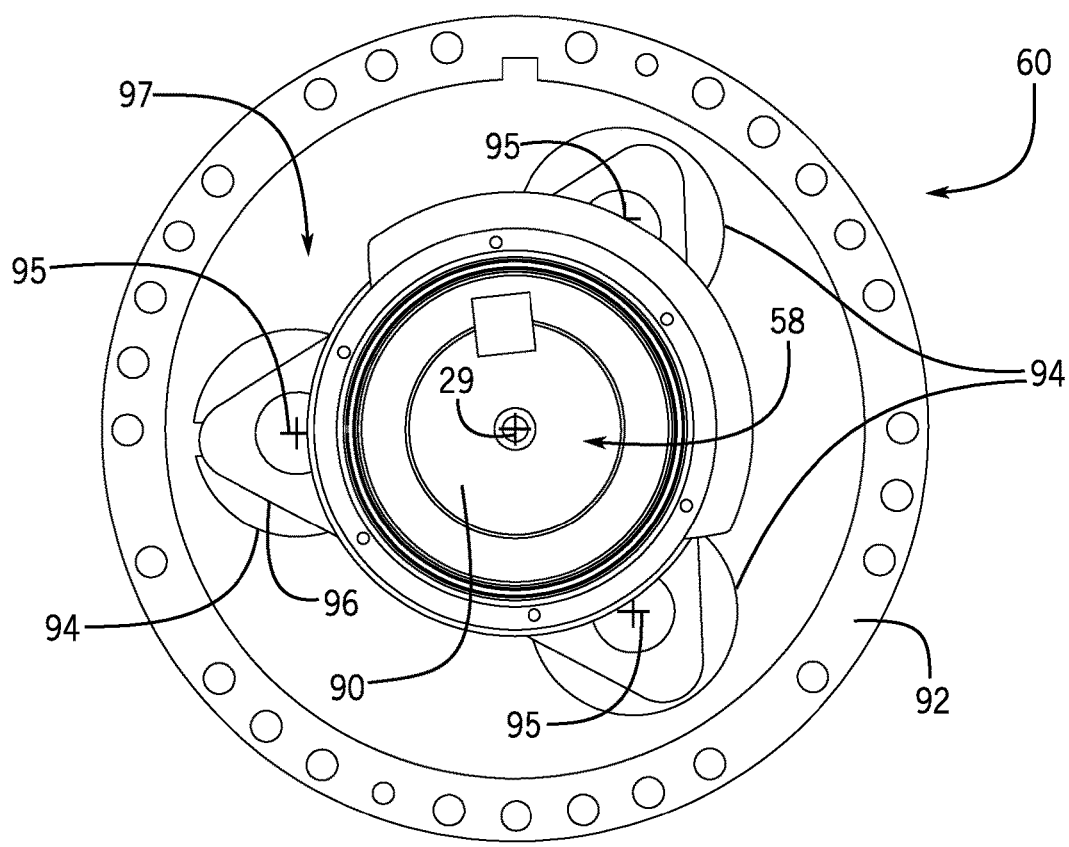
FIG. 4 is a plan view of an embodiment of a first planetary gear assembly of the gear assembly of FIG. 3, in accordance with an aspect of the present disclosure.

FIG. 4 is a plan view of the first planetary gear assembly 60. As shown in the illustrated embodiment of FIG. 4, during normal operation, the first carrier 99 of the one or more first carriers 96 may rotate about the axis 29 as a result of rotation of the first shaft 58. Accordingly, rotation of the first carrier 99 may then drive rotation of the one or more first planet gears 94, which may rotate about their axes 95 and move circumferentially along an inner circumference of the first ring gear 92 (e.g., the first ring gear 92 remains substantially stationary). The one or more first planet gears 94 may be coupled to and supported by the one or more first carriers 96, such that the first planet gears 94 have their axes 95 in fixed positions relative to one another. Accordingly, the rotation of the first planet gears 94 along the first ring gear 92 results in rotation of the first sun gear 90 about the axis 29, which may drive rotation of the intermediate shaft 100. Additionally, as discussed above, during override conditions (e.g., rotation of the ball valve 20 driven by the override assembly 50), the first planetary gear assembly 60 may be substantially stationary. For example, the first sun gear 90, the first ring gear 92, the one or more first planet gears 94, and/or the one or more first carriers 96 may not rotate about the axis 29 when the valve assembly 10 operates in an override condition. Therefore, the first planetary gear assembly 60 may rotate as a result of rotation ultimately caused by the actuator 16, but the first planetary gear assembly 60 may not rotate as a result of actuation of the override assembly 50 (e.g., the external gear 66).

Figure 5:
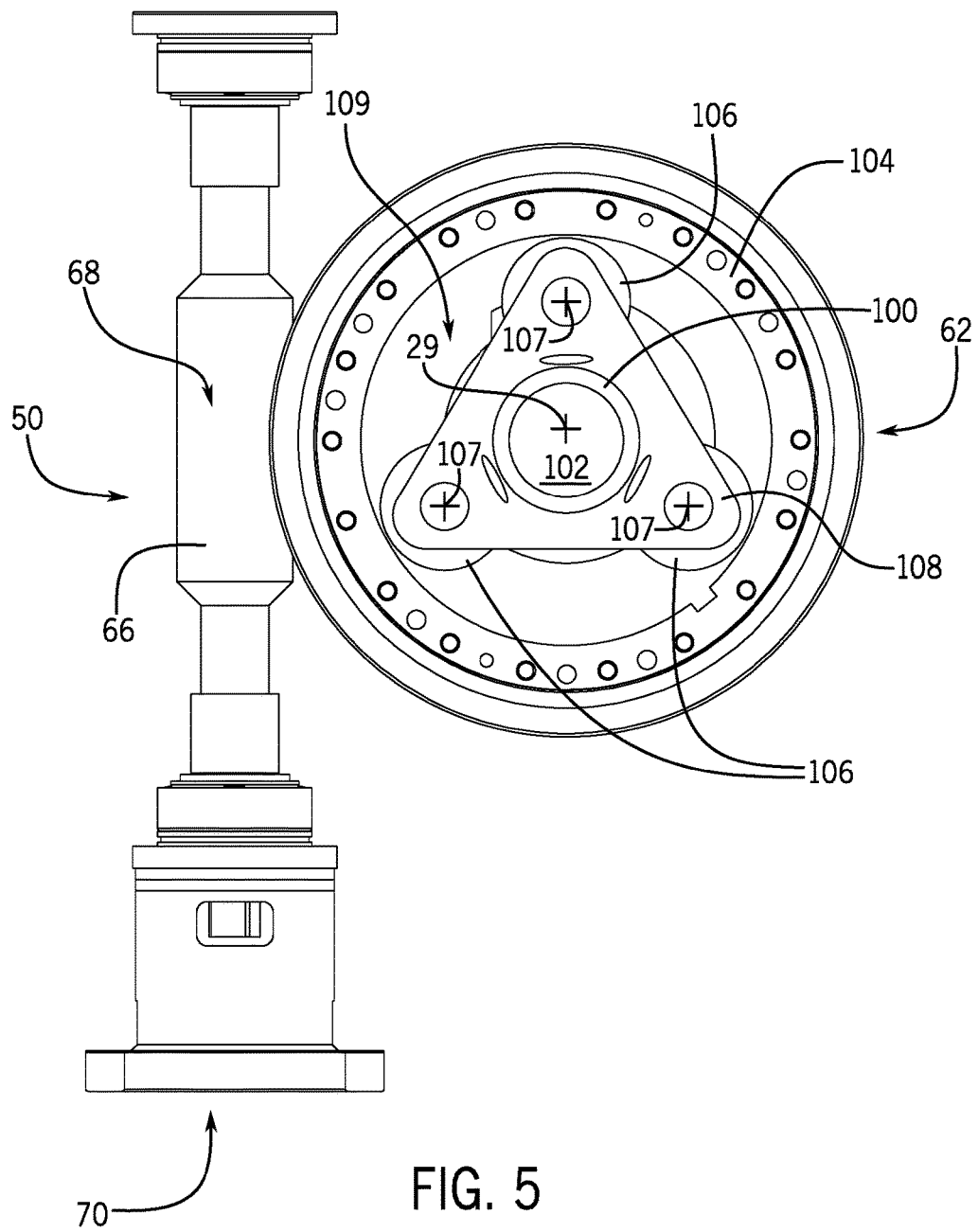
FIG. 5 is a plan view of an embodiment of a second planetary gear assembly of the gear assembly and the override assembly of FIG. 3, in accordance with an aspect of the present disclosure.

FIG. 5 is a plan view of the second planetary gear assembly 62. As discussed above, the one or more second planet gears 106 may rotate in response to operation of one or both of the actuator 16 and the override assembly 50 (e.g., the external gear 66). Accordingly, the one or more second planet gears 106 may rotate about their respective axes 107 causing rotation of the one or more second carriers 108 (e.g., planet-carrier assembly 109) about the axis 29 when either the actuator 16 and/or the override assembly 50 is activated (e.g., by an operator and/or the control system 40). Again, as discussed above, in the normal operating mode using the actuator 16, the first shaft 58 may rotate to drive rotation of the first planet gears 94 via rotation of the first carrier 99 of the one or more first carriers 96 while the first ring gear 92 remains stationary. In addition, rotation of the first planet gears 94 drives rotation of the first sun gear 90, which may be coupled to the intermediate shaft 100. The intermediate shaft may also be coupled to the second sun gear 102. Accordingly, rotation of the first sun gear 90 (e.g., ultimately caused by the actuator 16) drives rotation of the second sun gear 102. The second sun gear 102 may then drive rotation of the second planet gears 106 and the second carrier 108 while the second ring gear 104 remains stationary, such that the second carrier 108 directly or indirectly drives rotation of the ball valve 20.

Alternatively, in the override operating mode using the override assembly 50, the external gear 66 (e.g., worm gear screw 68) may rotate to drive rotation of the second ring gear 104, which in turn drives rotation of the second planet gears 106 and the second carrier 108 while the second sun gear 102 remains stationary, such that the second carrier 108 directly or indirectly drives rotation of the ball valve 20. In addition, during the override operating mode, the entire first planetary gear assembly 60 (e.g., first sun gear 90, first ring gear 92, first planet gears 94, and first carriers 96), the intermediate shaft 100, and the first shaft 58 may remain stationary. In this manner, the illustrated embodiment enables actuation of the ball valve 20 in an override operating mode without removing or deactivating the actuator 16.

Figure 6:
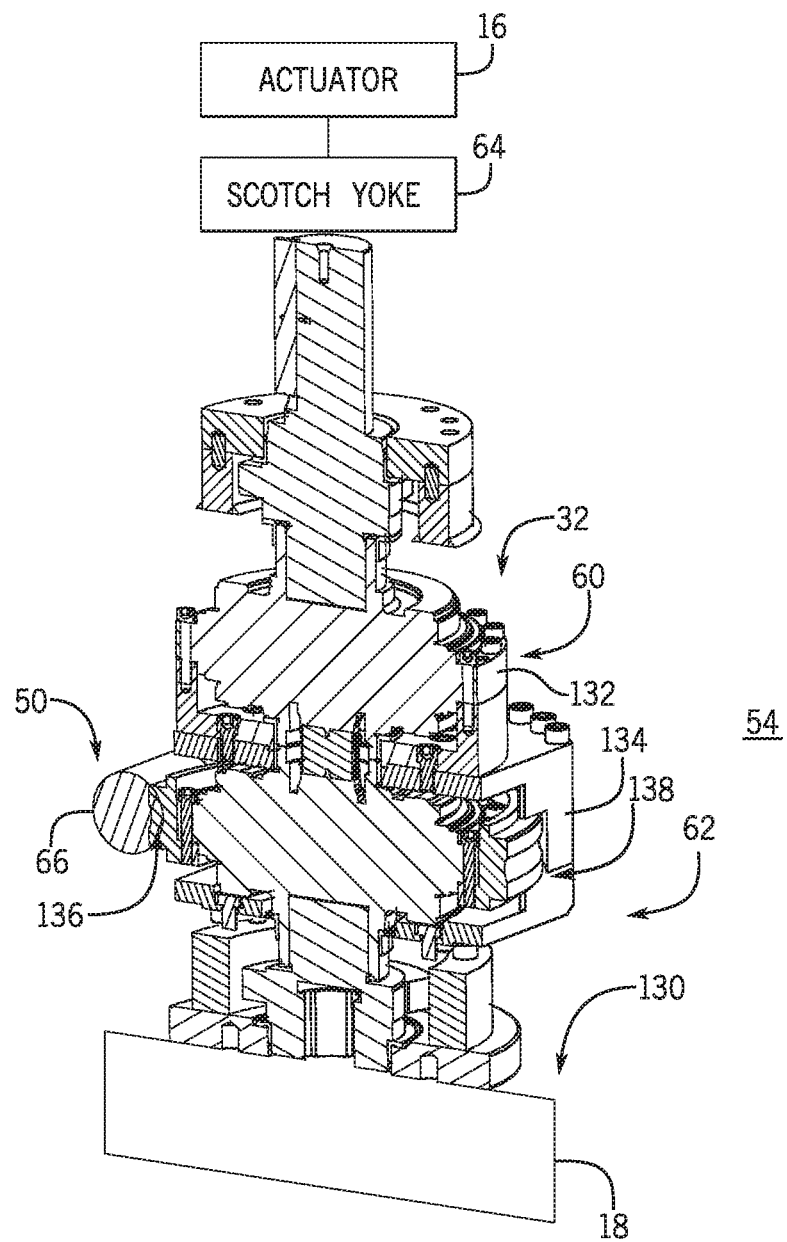
FIG. 6 is a cross section of an embodiment of the valve assembly of FIG. 2, in accordance with an aspect of the present disclosure.

FIG. 6 is a cross-section of an embodiment of the gear assembly 32 of the valve assembly 10, in accordance with an aspect of the present disclosure. As shown in the illustrated embodiment of FIG. 6, the first planetary gear assembly 60 is disposed above the second planetary gear assembly 62 with respect to a position 130 of the valve body 18. Accordingly, the first planetary gear assembly 60 may be positioned between the valve body 18 and the actuator 16. More specifically, the first planetary gear assembly 60 may be disposed between the second planetary gear assembly 62 and the actuator 16. Therefore, the actuator 16 may be configured to drive rotation of the first planetary gear assembly 60, which may in turn drive rotation of the second planetary gear assembly 62. Additionally, the second planetary gear assembly 62 may be configured to drive rotation of the ball valve 20.

In the illustrated embodiment of FIG. 6, the external gear 66 of the override assembly 50 is directly coupled to the second ring gear 104 of the second planetary gear assembly 62. The override assembly 50 may thus drive rotation of the second ring gear 104, which may in turn drive rotation of the ball valve 20 independent of the actuator 16, the first shaft 58, the first intermediate shaft 100, and/or the first planetary gear assembly 60.

In some embodiments, the first planetary gear assembly 60 may be enclosed by a first intermediate housing 132 and the second planetary gear assembly 62 may be enclosed by a second intermediate housing 134. The first intermediate housing 132 and the second intermediate housing 134 may further be enclosed by the housing 52. In certain embodiments, the second intermediate housing 134 may include an opening 136 configured to receive at least a portion of the override assembly 50 (e.g., the external gear 66). Accordingly, the portion of the override assembly 50 (e.g., the external gear 66) may be directly coupled to the second ring gear 104 of the second planetary gear assembly 62. Further, the second intermediate housing 134 of the override assembly 50 may include an additional opening 138. At least a portion of the second ring gear 104 of the second planetary gear assembly 62 is configured to extend outward from the second intermediate housing 132 through the additional opening 138. As shown in the illustrated embodiment of FIG. 6, the gear assembly 32 and the override assembly 50 may be isolated from the environment 54 surrounding the valve assembly 10 by the housing 52, the first intermediate housing 132, and/or the second intermediate housing 134.

Figure 7:
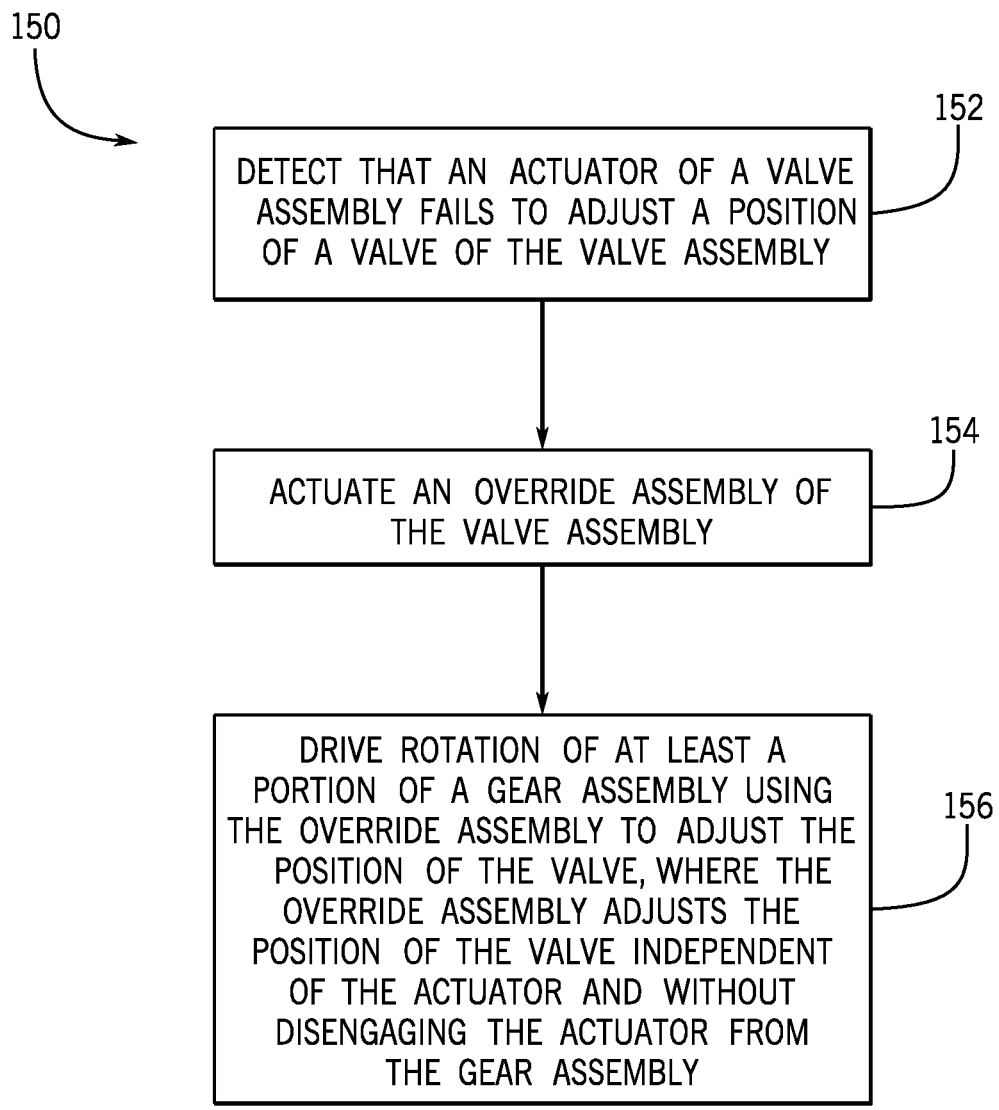
FIG. 7 is a block diagram of an embodiment of a process that may be utilized to override the actuator of the valve assembly, in accordance with an aspect of the present disclosure.

FIG. 7 is a block diagram of an embodiment of a method 150 that may be utilized to override the actuator 16 to adjust the position of the ball valve 20. For example, at block 152 the valve assembly 10 may detect that the actuator fails to adjust the position of the ball valve 20. For example, in some embodiments, the valve assembly 10 may include the sensor 46 that monitors a characteristic (e.g., flow rate, pressure, temperature, density, vibration, force, acoustics, or a combination thereof) of the fluid 12 through the flow path 14 and/or a parameter of the ball valve 20 (e.g., resistance to movement, electrical properties, vibration, acoustics, expected position versus actual position, or a combination thereof). Accordingly, when feedback from the sensor 46 is inconsistent with a command (e.g., signal) sent to the actuator 16, the control system 40 may determine that the actuator 16 fails to adjust the position of the ball valve 20 (e.g., the actuator 16 is jammed and/or otherwise failing to adjust the position of the ball valve 20). Additionally or alternatively, the sensor 46 may indicate that the actual position of the ball valve 20 is not consistent with an expected position of the ball valve based on the parameter of the ball valve (e.g., electrical properties, vibration, resistance, acoustics).

As a non-limiting example, the control system 40 may receive feedback from the sensor 46 indicating that pressure in the well exceeds a threshold (e.g., blowout conditions detected). Accordingly, the control system 40 may send a signal to the actuator 16 to close the ball valve 20 and block a flow of the fluid from the well to the surface. However, the control system 40 may subsequently receive feedback from the sensor 46 indicating a significant flow of fluid downstream of the ball valve 20 when the flow should be substantially zero. The control system 40 may then determine that the actuator 16 failed to adjust the position of the ball valve 20 and signal to an operator that the override assembly 50 should be activated and/or automatically actuate the override assembly 50.

When the control system 40 determines that the actuator 16 fails to adjust the position of the ball valve 16, the control system 40, an operator, and/or an ROV may be configured to actuate the override assembly 50, as shown at block 154. For example, in some embodiments, the override assembly 50 may be actuated via an external actuator coupled to the control system 40. Accordingly, the control system 40 may send one or more signals to the override assembly 50 to rotate the external gear 66, which may in turn, drive rotation of the second ring gear 104 of the second planetary gear assembly 62. In other embodiments, the ROV may be utilized to actuate the override assembly 50 by utilizing a tool (e.g., a wrench) to rotate the tool interface 72 of the override assembly 50. In still further embodiments, an operator may actuate the override assembly 50 upon being alerted that the actuator 16 failed to adjust the position of the ball valve 20.

At block 156, the override assembly 50 may drive rotation of at least a portion of the gear assembly 32 (e.g., the second planetary gear assembly 62) to adjust the position of the ball valve 20. As discussed above, the override assembly 50 adjusts the position of the ball valve 20 independent of the actuator 16 and without disengaging the actuator 16 from the gear assembly 32. Actuating the override assembly 50 may drive rotation of the external gear 66. The external gear 66 may then drive rotation of the second ring gear 104 of the second planetary gear assembly 62. The second ring gear 104 may drive rotation of the one or more second planet gears 106. The one or more second planet gears 106 may be coupled to one another by the one or more second carriers 108, which may then drive rotation of the valve stem 38, and thus the ball valve 20. Accordingly, the position of the ball valve 20 may be adjusted by the override assembly 50 when the actuator 16 fails and without disengaging the actuator from the gear assembly 32.

In some embodiments, a system may include a flow path configured to convey a fluid flow in a mineral extraction system, a valve disposed along the flow path and configured to adjust a flow rate of the fluid through a valve body of the valve, an actuator configured to drive rotation of the valve, a gear assembly comprising a first planetary gear assembly and a second planetary gear assembly, wherein the first planetary gear assembly is coupled to the actuator, and wherein the second planetary gear assembly is coupled to the valve, an override assembly coupled to the second planetary gear assembly, wherein the override assembly is configured to drive rotation of the valve independent of the actuator and without disengaging the actuator from the gear assembly, and a controller configured to receive feedback from a sensor disposed along the flow path, and wherein the controller is configured send a signal to the actuator or the override assembly based at least on the feedback. The system may also include a sensor configured to monitor one or more characteristics of the flow of fluid through the valve body.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims.

The invention claimed is:

1. A valve assembly, comprising:
a valve configured to adjust a flow of fluid through a valve body of the valve assembly;
an actuator configured to drive rotation of the valve;
a gear assembly comprising a first planetary gear assembly and a second planetary gear assembly, wherein the first planetary gear assembly is coupled to the actuator, and wherein the second planetary gear assembly is coupled to the valve; and
an override assembly comprising an external gear that is at least partially external to a housing of the second planetary gear, wherein the housing comprises an opening configured to enable the external gear to directly couple to the second planetary gear assembly, wherein the override assembly is configured to drive rotation of the valve independent of the actuator and without disengaging the actuator from the gear assembly, and wherein the housing comprises an additional opening configured to enable at least a portion of a ring gear of the second planetary gear assembly to extend outward from the housing through the additional opening.

2. The valve assembly of claim 1, wherein the external gear is configured to directly couple to the second planetary gear and drive rotation of the second planetary gear when the override assembly is actuated.

3. The valve assembly of claim 2, wherein the first planetary gear assembly comprises a first sun gear, an additional ring gear, and one or more first planet gears, and wherein the second planetary gear assembly comprises a second sun gear, the ring gear, and one or more second planet gears.

4. The valve assembly of claim 3, wherein the external gear of the override assembly is coupled to the ring gear of the second planetary gear assembly.

5. The valve assembly of claim 4, wherein the ring gear of the second planetary gear assembly is configured to drive rotation of the one or more second planet gears of the second planetary gear assembly.

6. The valve assembly of claim 5, wherein the one or more second planet gears are coupled to one another by one or more carriers, and wherein the one or more carriers are coupled to a valve stem configured to rotate the valve.

7. The valve assembly of claim 4, wherein the override assembly comprises an access opening that provides access to a tool interface coupled to the external gear.

8. The valve assembly of claim 7, wherein an operator, a remote operated vehicle, or another suitable device is configured to apply torque to the tool interface to actuate the override assembly.

9. The valve assembly of claim 3, wherein the first planetary gear assembly is coupled to the actuator by a first shaft, and wherein the first sun gear of the first planetary gear assembly is coupled to the second sun gear of the second planetary gear assembly by an intermediate shaft.

10. The valve assembly of claim 9, wherein the first shaft is configured to drive rotation of the first sun gear, rotation of the first sun gear causes rotation of the second sun gear, and wherein the second sun gear is configured to drive rotation of the one or more second planet gears.

11. The valve assembly of claim 10, wherein the additional ring gear and the ring gear are configured to remain substantially stationary when the first sun gear rotates and when the second sun gear rotates.

12. The valve assembly of claim 1, wherein the gear assembly comprises a scotch yoke device configured to convert linear motion of the actuator into rotational motion.

13. The valve assembly of claim 1, wherein the valve is a quarter-turn ball valve.

14. The valve assembly of claim 1, comprising a sensor configured to monitor one or more characteristics of the flow of fluid through the valve body.

15. The valve assembly of claim 14, comprising a controller coupled to the sensor and the actuator, wherein the controller is configured to send a signal to the actuator based on feedback received from the sensor, and wherein the controller is configured to determine when the actuator fails to drive rotation of the valve based on the signal, the feedback, or both.

16. The valve assembly of claim 1, wherein the valve is configured to adjust the flow of fluid through the valve body to control the flow of fluid through a mineral extraction system.

17. A system, comprising:
a flow path configured to convey a fluid flow in a mineral extraction system;
a valve disposed along the flow path and configured to adjust a flow rate of the fluid flow through a valve body of the valve;
an actuator configured to drive rotation of the valve;
a gear assembly comprising a first planetary gear assembly and a second planetary gear assembly, wherein the first planetary gear assembly is coupled to the actuator, and wherein the second planetary gear assembly is coupled to the valve;
an override assembly comprising an external gear that is at least partially external to a housing of the second planetary gear assembly, wherein the housing comprises an opening configured to enable the external gear to directly couple to the second planetary gear assembly, wherein the override assembly is configured to drive rotation of the valve independent of the actuator and without disengaging the actuator from the gear assembly, and wherein the housing comprises an additional opening configured to enable at least a portion of a ring gear of the second planetary gear assembly to extend outward from the housing through the additional opening; and
a controller configured to receive feedback from a sensor disposed along the flow path, and wherein the controller is configured send a signal to the actuator or the override assembly based at least on the feedback.

18. A method, comprising:
detecting an event when an actuator of a valve assembly fails to adjust a position of a valve of the valve assembly, wherein the valve assembly comprises a first planetary gear assembly and a second planetary gear assembly, and wherein the actuator is coupled to the first planetary gear assembly;
actuating an override assembly coupled to the second planetary gear assembly upon detection of the event; and
driving rotation of the second planetary gear assembly using an external gear of the override assembly to adjust the position of the valve, wherein the override assembly adjusts the position of the valve independent of the actuator and without disengaging the actuator from the gear assembly, wherein the external gear is at least partially external to a housing of the second planetary gear assembly, wherein the housing comprises an opening configured to enable the external gear to directly couple to the second planetary gear, and wherein the housing comprises an additional opening configured to enable at least a portion of a ring gear of the second planetary gear assembly to extend outward from the housing through the additional opening.

* * * * *